United States Patent [19]
Holtkamp et al.

[11] 3,910,440
[45] Oct. 7, 1975

[54] VERTICAL LIFT, EXTENDIBLE REACH MECHANISM FOR A TRUCK

[75] Inventors: Donald A. Holtkamp; Willard L. Chichester, both of Battle Creek, Mich.

[73] Assignee: Clark Equipment Company, Buchanan, Mich.

[22] Filed: July 11, 1973

[21] Appl. No.: 378,160

[52] U.S. Cl. ............... 214/770; 212/46 B; 214/141
[51] Int. Cl.² ........................................... E02F 3/85
[58] Field of Search ........... 214/770, 141, 133, 762, 214/763, 764, 148; 212/46 B

[56] References Cited
UNITED STATES PATENTS

| | | | |
|---|---|---|---|
| 3,178,046 | 4/1965 | Lull | 214/141 |
| 3,352,441 | 11/1967 | Alden | 214/771 |
| 3,410,433 | 11/1968 | Brown | 214/770 |

*Primary Examiner*—Albert J. Makay
*Assistant Examiner*—Ross Weaver
*Attorney, Agent, or Firm*—Marmaduke Hobbs; Hobbs & Green

[57] ABSTRACT

A vertical lift extendible reach mechanism for a truck having a forward end and a rearward end in which one or more posts are mounted on the rear of the truck and a boom is pivotally connected to the upper end of the post and extends forwardly over the truck and supports an attachment on the forward end. A power means pivots the post forwardly and rearwardly to move the boom and attachment forwardly and rearwardly, and a power means raises and lowers the forward end of the boom. A third power means, such as a hydraulic cylinder, controls the forward end of the boom and the attachment thereon, as the second mentioned power means is operated, to cause the forward end of the boom and the attachment to move in a substantially vertical line between its lowered and raised positions. The hydraulic cylinder for controlling the forward end of the boom may operate telescopic sections in the boom to retract and extend as the forward end thereof is moved between its two positions.

6 Claims, 5 Drawing Figures

VERTICAL LIFT, EXTENDIBLE REACH MECHANISM FOR A TRUCK

An extendible reach mechanism for a truck has special applications and advantages in the construction field, in that loads can be picked up, delivered to the construction or building site, and lifted to and placed on scaffolding, without the necessity of special or separate handling to transfer the load from the truck load carrying attachment to the scaffold platform or other work supporting structure. This type of truck has the further special advantage of being able to pick up a load immediately in front of the truck where the ground is firm, transport the load to the work site, and deliver it to the scaffolding platform or partially completed building and yet avoid driving onto the usually soft backfill around the outside of the building. The extended reach trucks of the standard or well known construction utilize a parallelogram arrangement for the members supporting the forwardly extending support or boom, with the members pivotally connected to one another and to the truck frame. Since the foregoing type of extendible reach mechanism normally has a forwardly extending boom which is pivotally connected to the truck near the rear end thereof, the forward end of the boom and the load lifting attachment thereon follow an arcuate path as the attachment is raised and lowered. As the attachment is raised, it moves in an arc first upwardly and forwardly to a point substantially level with the rear pivot of the boom, and then, as the upward movement continues, it moves rearwardly following the same general arc. The forward thrust of the attachment followed by retraction as the forward end of the boom is raised, often causes difficulty in handling and placing a load in the desired position. It is therefore one principal object of the present invention to provide an extendible reach truck having a pivoted boom in which the mechanism operates to raise and lower the load attachment on a substantially vertical line, eliminating the normal arcuate path of the attachment between its lowered and raised positions.

In the conventional, extended reach truck, movement of the members forwardly to a point approaching the fully extended position results in a drooping of the forward end of the boom, thus causing difficulty in picking up a load and positioning it at the desired level and maintaining it at that level while advancing the load until it is deposited onto the scaffold platform or other work support. The problem caused by the failure of the prior extended reach trucks to advance the load on a horizontal plane, particularly as the load approached its fully extended position, was compounded by the effect of heavy loads compressing the tires on the front wheels adjacent the load attachment, and by the dip caused by soft ground traversed by those wheels as the truck approached the place where the load was to be discharged. While movement of the load on a horizontal plane would not eliminate the difficulty caused by the load on the tires or soft ground, it would result in easier and more effective control of the extended reach mechanism and load attachment under those adverse conditions. It is thus another object of the present invention to provide an extended reach truck in which the load supporting mechanism will operate to maintain the load on the attachment on a plane as it is moved forwardly or rearwardly between its maximum and minimum limits of reach, regardless of the tendency of the load to dip as a result of compressing the tires or soft ground, and which will simultaneously correct the movement of the attachment to cause it to move in a vertical path as the boom is pivoted in lifting and lowering a load.

Another object of the invention is to provide a truck having an extended reach mechanism which has the ability to pick up a load below ground level, and which can be controlled either manually or automatically to compensate for compression of the truck tires by the load or downward or upward tilting of the forward end of the truck as a result of the terrain, to obtain movement of the load on a horizontal plane under those conditions.

Still another object of the invention is to provide a material handling truck of the extensible reach type, in which the reach mechanism is controlled by an electrical and hydraulic system which will provide effective control of the lift and reach mechanism and which will perform efficiently under various adverse operating conditions.

A further object of the invention is to provide a material handling truck having an extended load mechanism of the aforesaid type which is so constructed and designed that it has maximum stability in all load handling positions and can be adapted to various types of truck designs without any appreciable modifications in the basic structure of the mechanism.

Further objects and advantages of the present invention will become apparent from the following description and accompanying drawings, wherein.

Figure 5:
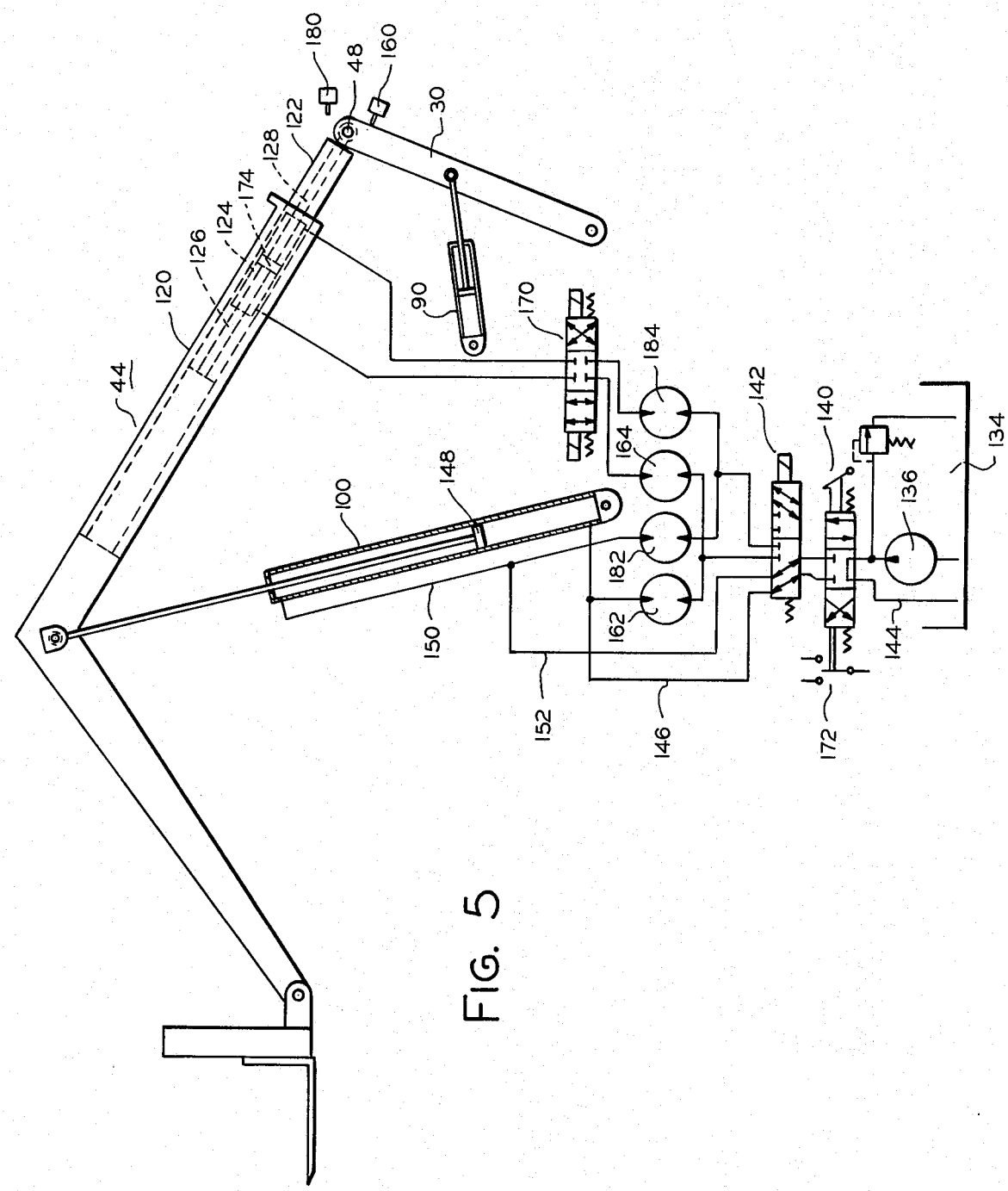
FIG. 5 is a schematic diagram of the operating and control systems of the extended reach mechanism.

Referring more specifically to the drawings, numeral 10 indicates generally a lift truck on which the extended reach mechanism 12 is mounted, the truck having front drive wheels 14 and 16 and rear steerable wheels 18 and 20. While only the front wheels are driven and the rear wheels are steerable, the truck may be one in which the front and rear wheels are steerable and in which both sets of wheels are drive wheels. The motor driving the truck and providing the power for operating the extended reach mechanism is under hood or cover 22 and is mounted on frame 24, and the truck is controlled by an operator from cab 26 wherein the manual controls shown in FIG. 5 are located. While the extended reach mechanism may be mounted on various types of trucks and truck frames, the one shown has two longitudinal side members and a plurality of cross members forming the support for the motor, controls and cab, and also forming the basic support for the extended reach mechanism. Various changes in the truck structure can be made to adapt it to the desired operation to be performed thereby.

Figure 1:
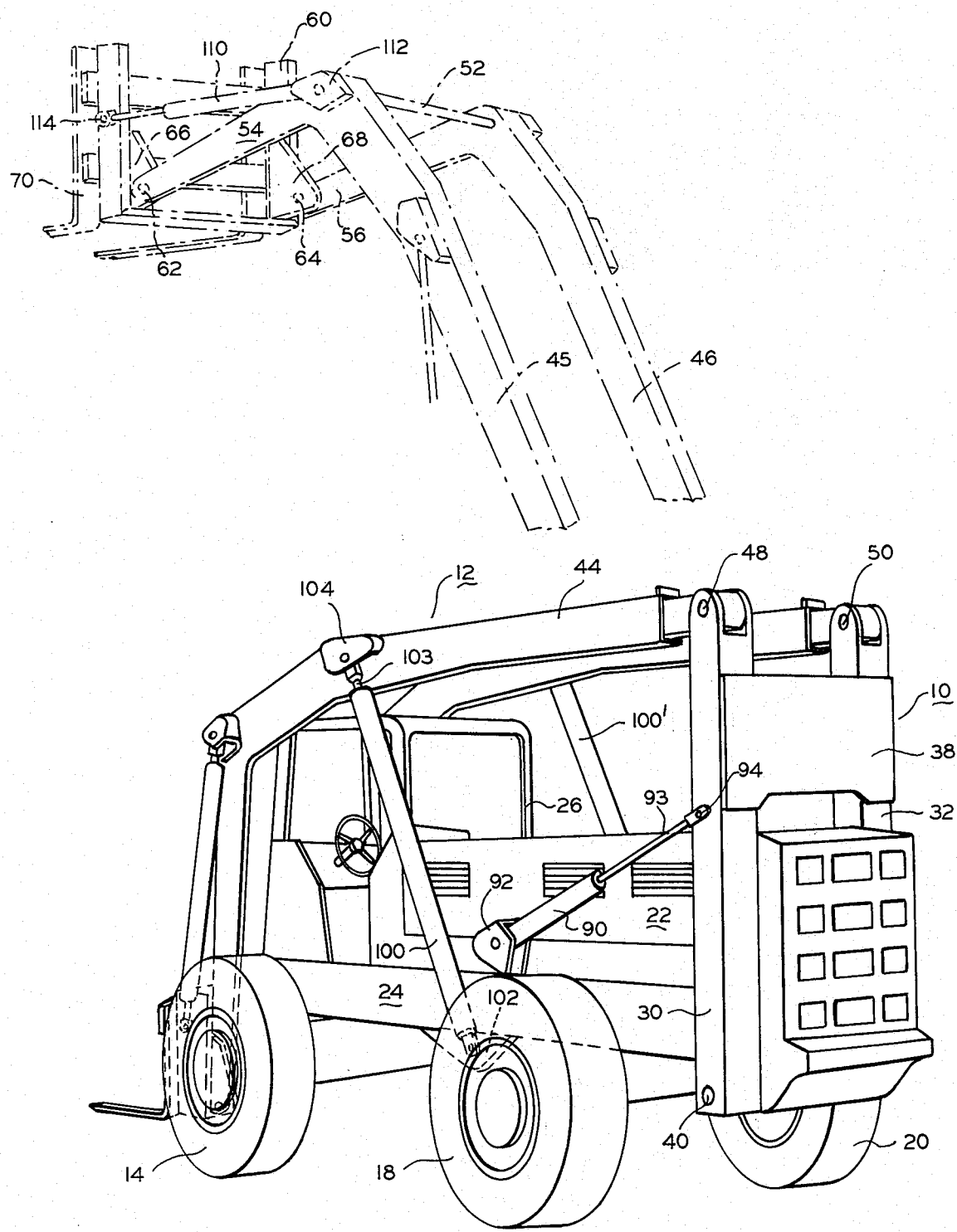
FIG. 1 is a perspective view of an extended reach truck embodying the present invention, showing the extended reach mechanism in both its lowered position in full lines and in its raised position in broken lines.
Figure 2:
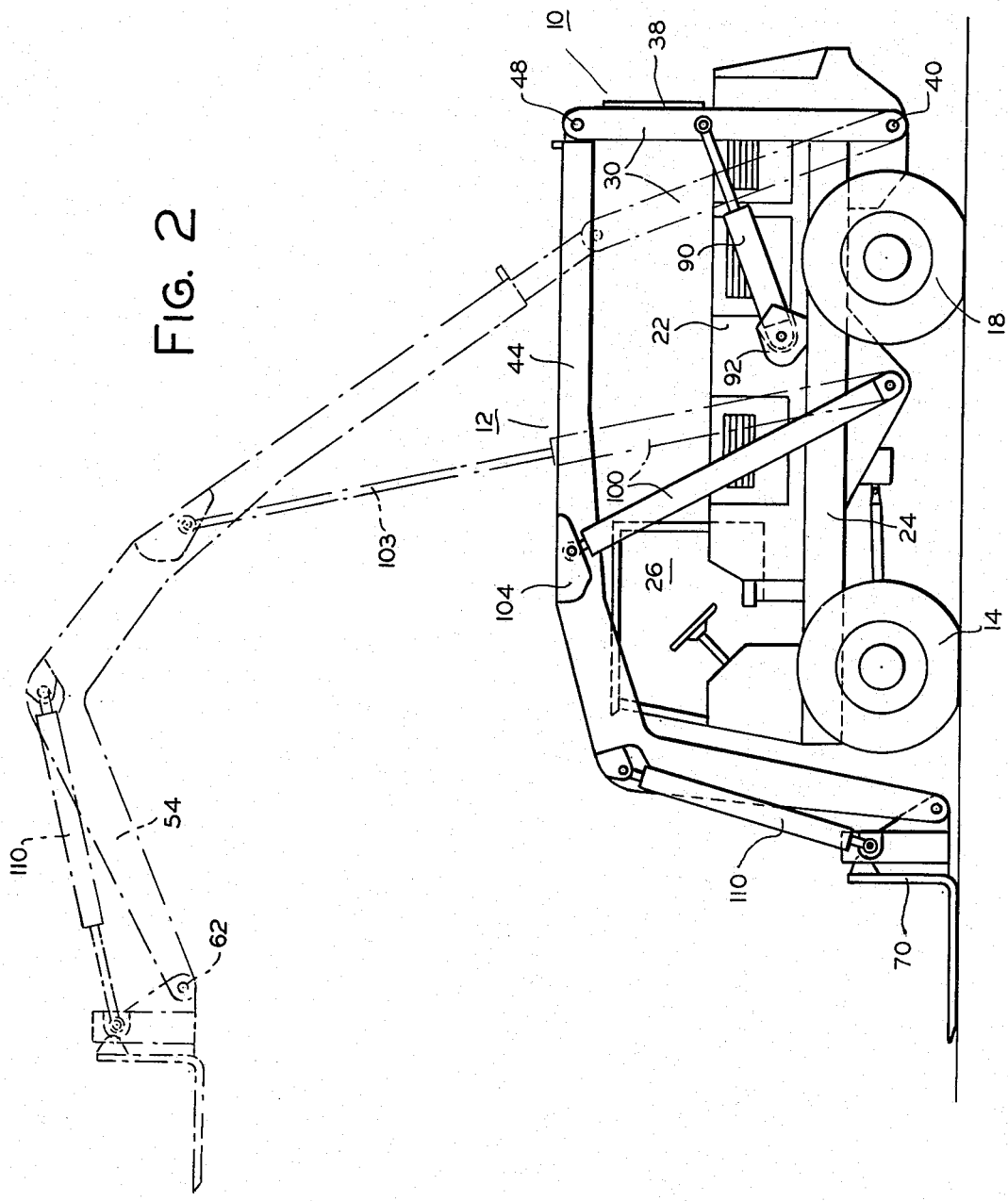
FIG. 2 is a side elevational view of the present lift truck illustrating the extended reach mechanism in its lowered and elevated positions.
Figure 3:
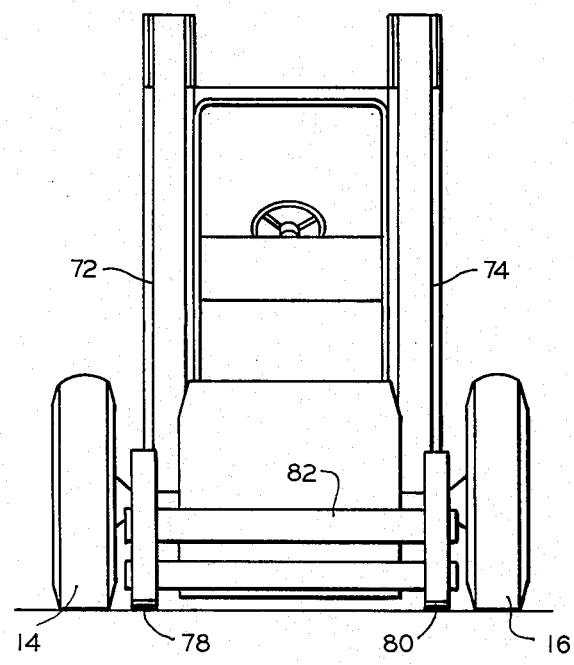
FIG. 3 is a front elevational view of the truck shown in FIGS. 1 and 2.
Figure 4:
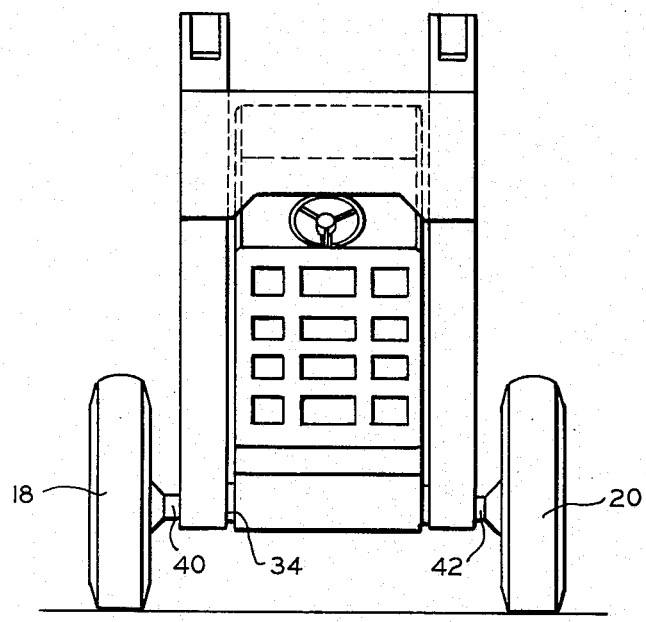
FIG. 4 is a rear elevational view of the truck shown in the preceding figures.

The extended lift mechanism 12 includes a pair of posts 30 and 32 normally assuming a substantially upright position and being pivotally mounted on a shaft 34 secured to the rear end of frame 24 by a mounting fixture. The two posts are rigidly joined to one another by a steel plate 38 to form a bifurcated structure which is adapted to tilt forwardly and rearwardly on the two pivot means 40 and 42, respectively, at opposite ends of shaft 34. Boom or arm 44 consisting of two longitudinal members 45 and 46 is pivotally connected to the upper ends of posts 30 and 32, respectively, and extends forwardly therefrom generally parallel laterally to the two sides of frame 24, the two members being adapted to pivot on the upper ends of the posts from a position such as that shown in solid lines in FIG. 2 to an elevated position shown in broken lines. Longitudinal boom arms 45 and 46 are pivotally connected to the upper end of posts 30 and 32 by shafts 48 and 50, respectively. A plurality of cross members 52 tie the two longitudinal arms together so that they operate in unison in moving loads from one position to another, both forwardly and rearwardly and up and down. Joined to the forward end of the arms and forming a part thereof are extensions 54 and 56 joined rigidly at one end to the main portion of the arms and pivotally supporting an upright 60 at the other end. Pivot pins 62 and 64 connect the forward end of the extensions to fixtures 66 and 68, respectively, on the upright. The upright, which may be considered conventional for the purpose of the present description and which is shown here fragmentarily to assist in fully understanding the invention, supports a fork lift attachment 70 mounted on the front of upright 60 on vertically spaced tracks 72 and 74, and is moved to various vertical positions on the upright by a suitable power mechanism such as a hydraulic cylinder. The fork attachment is provided with two spaced forks 78 and 80 rigidly connected to and supported by carriage 82.

Posts 30 and 32 are pivoted forwardly and rearwardly on pivots 40 and 42 by cylinder assemblies 90 on opposite sides of the truck which are connected at one end to frame 24 by fixture 92 and connected at the other end through the piston rod 93 to pivot means 94, the two hydraulic cylinders being operated together from the same hydraulic system. The boom is raised and lowered and pivoted relative to posts 30 and 32 by a pair of hydraulic cylinder assemblies 100 and 100', the lower end of each cylinder being connected to the frame by a fixture 102 on each side, and the other end through piston rod 103 to the arms by a fixture 104 on each side, and the two cylinder assemblies being operated in unison from the same hydraulic system. The cylinders 90 and 100 and the interconnecting frame and arm form a trapezoid configuration which permits the mechanism easily to dip forwardly well below ground level to pick up or deposit a load. It is seen that fixture 104 for the upper end of cylinder assembly 100 is spaced further from pivot 48 than fixture 102 for the lower end of the assembly is from pivot means 40. The upright is moved to various angular positions or maintained in a vertical position as the arms are raised and lowered by a pair of hydraulic cylinders, one of which is indicated by numeral 110 and is pivotally connected to extension 54 by a fixture 112 and to one of the side members of the upright by a fixture 114. The hydraulic cylinder on the upright may be operated from the hydraulic system of the truck as part of the system which operates the hydraulic cylinders of the extended reach mechanism or by a separate hydraulic system, as desired. The foregoing extended lift mechanism for maintaining the load on a horizontal plane as the load is extended and retracted is claimed in copending applications Ser. Nos. 250,697, and 221,346, common assignee, now U.S. Pat. Nos. 3,802,589 and 3,834,569, respectively.

The system for obtaining the straight line vertical raising and lowering of the attachment is illustrated in FIG. 5. This system may be used with or without the systems illustrated in the above mentioned prior applications and can be integrated with those systems to control the vertical movement along with the operation of any one of the several systems. In the present mechanism, longitudinal members 45 and 46 of boom arm 44 each consists of outer telescopic section 120 and an inner telescopic section 122 operated by a hydraulic motor, such as a hydraulic cylinder 124 shown disposed in the respective arms, the hydraulic cylinder being shown in broken lines in FIG. 5. The operation of the cylinder either extends or contracts the respective longitudinal member 45 or 46 in accordance with requirements for maintaining the attachment on a vertical line as boom 44 is pivoted between its lowered and elevated positions. The cylinder which is of the double acting type may be considered conventional for the purpose of the present description and is rigidly mounted in outer telescopic member 120 and connected thereto by a rod 126 and to post 30 or 32 by rod 128 at pivot point 48 or 50.

The system which operates hydraulic cylinder 124 includes a reservoir 134 and a fixed displacement pump 136 which supplies the hydraulic fluid under pressure for operating the cylinder. A directional control valve 140 controls the operation of boom cylinder 100 which, when operated in a normal manner, swings boom 44 upwardly and downwardly as it pivots on shafts 48 and 50. Thus this operation produces an arc which projects forwardly until the boom passes the horizontal plane intersecting the pivot point. The arcuate movement of the attachment is eliminated by the system. While valve 140 is in the position illustrated in FIG. 5, a valve 142 is operated to connect cylinder 100 through valve 140 with either pump 136 or return line 144. When cylinder 100 is to be operated to raise the boom, the valve 140 is moved to the right so that the pressure from the pump will pass through valve 142 in the position illustrated in the drawings, thence through line 146 to the cylinder beneath piston 148. The fluid above the piston is returned through lines 150 and 152 and through the two valves to return line 144.

When the vertical line motion is desired for the front end of the boom and the attachment mounted thereon, the two rear posts 30 and 32 are moved to their rearward position, which actuates a switch 160, thus causing valve 142 to shift to the left, as seen in FIG. 5. Hydraulic fluid is then directed to flow dividers 162 and 164 with oil flowing from flow divider 162 entering boom cylinder 100 beneath piston 148 causing the forward end of the boom to elevate. Simultaneously, oil enters flow divider 164 and flows through valve 170 which is actuated by the closing of switch 160 and switch 172 on valve 140, thereby moving valve 170 to the position to allow fluid to flow to hydraulic cylinder 124 on the rear side of piston 174. This creates a rearward motion in boom arms 45 and 46 simultaneously with the motion created by the lifting of the boom by cylinder 100, until the mid point is reached, i.e. substantially level position of the attachment with respect to pivots 48 and 50. When this position is reached, switch 180 is tripped, causing valve 170 to shift, reversing the flow of oil in hydraulic cylinder 124, thus causing the cylinder to extend the telescopic sections 120 and 122 of the boom arms back to their original position as the lifting action of the boom continues above mid point.

Thus, it is seen that the tendency of the boom to swing upwardly and forwardly while it is below the level of the pivot point, is offset by the action of cylinder 124 retracting the boom arms by telescoping the two sections 120 and 122 inwardly and, when the boom passes center and moves upwardly, the tendency of the boom to swing rearwardly is offset by hydraulic cylinder 124 extending the boom arms, thus achieving the vertical line movement of the forward end of the boom and the attachment thereon. When the forward end of the boom and the attachment are to be lowered in a straight vertical line, the operation is essentially reversed from that previously described herein. Flow dividers 182 and 184 deliver the fluid from the motor through valves 140 and 142 to the upper ends of cylinder 100 and through flow divider 184 first to the lower end of cylinder 124 to retract the boom arm and then after the arm passes horizontal plane through the pivot points, through valve 170 to the upper side of the piston in cylinder 124 to extend the arm, thereby maintaining the vertical line motion.

In the operation of the vertical lift extendible reach truck mechanism, in combination with the mechanisms disclosed in the patents previously mentioned herein, the operator operates the cylinders 90 and 100, for example, to lower attachment 70 to its lowermost position for picking up a load. When the attachment is in this position, cylinder 90 is operated to cause the boom to move forwardly and slip the tines of the attachment beneath the load. With a load on the attachment, hydraulic cylinder 90 is operated to move posts 30 and 32 to their rearward position where switch 160 is actuated, and hydraulic cylinder 100 is operated to lift the boom arms 45 and 46. The valves 140 and 142 operate in conjunction with valve 170 first to retract the two boom arms by the telescopic action produced by cylinder 124 as cylinder 100 lifts the attachment to the position substantially level with pivot pins 48 and 50. Thereafter, valve 170 is operated by switch 180 to cause the boom arm to extend as hydraulic cylinder 100 continues its lifting action on the arms, thereby maintaining the movement of the attachment on a vertical line. When the load has been placed in the desired vertical position, cylinder 90 is operated to move the load forwardly, and the load leveling mechanisms shown in any one of the previously mentioned applications operate to maintain the load on the desired elevated position while it approaches the place where it is to be discharged. The operation for lowering a load on a vertical line is obtained by reversing the aforementioned procedure.

While the present vertical extendible truck mechanism may be used in conjunction with the extensible reach mechanisms described in the previously referred to applications, it may be operated as a separate mechanism regardless of the type of lift mechanism used for the beams. Only one embodiment of the present vertical lift mechanism has been described in detail herein; however, various changes and modifications may be made without departing from the scope of the invention.

We claim:

1. A vertical lift, extendible reach mechanism for a truck having a forward end and a rearward end, comprising a post pivotally connected at its lower end to the rear of the truck, a boom pivotally connected to the upper end of said post and extending forwardly therefrom, said boom having telescopic sections for varying the effective length thereof, a load carrying attachment connected to the forward end of said boom, a power means connected to said post for pivoting said post forwardly and rearwardly to move said boom and load attachment forwardly and rearwardly, a power means for lifting and lowering the forward end of the boom while pivoting on said post, a hydraulic cylinder moving said telescopic sections relative to one anotehr for retracting the forward end of the boom as said end is raised to a point substantially level with the rear pivot point of said boom and for extending the forward end of the boom as said end is raised above said pivot point to cause said forward end and attachment thereon to move in a substantially straight vertical line between their lowered and raised positions, a hydraulic system having a control valve means therein for operating said cylinder, and a switch means responsive to the movement of said telescopic sections actuating said valve means to extend said telescopic section.

2. A vertical lift, extendible reach mechanism for a truck as defined in claim 1, in which said power means for retracting and extending said boom consists of a double acting hydraulic cylinder.

3. A vertical lift, extendible reach mechanism for a trucak as defined in claim 1, in which said hydraulic cylinder is operated simultaneously with the operation of said second power means to maintain the forward end of the boom and the attachment therein on a substantially vertical line as the boom is raised and lowered by said second power means.

4. A vertical lift, extendible reach mechanism for a truck as defined in claim 2, in which said hydraulic cylinder is operated simultaneously with the operation of said second power means to maintain the forward end of the boom and the attachment therein on a substantially vertical line as the boom is raised and lowered by said power means.

5. In a vertical lift, extendible reach mechanism for a truck having a forward end and a rearward end, a post pivotally connected at its lower end to the rear end of the truck, and a boom pivotally connected to the upper end of said post and extending forwardly therefrom: a system including telescopic sections in the boom for retracting and extending the forward end of the boom as the forward end of the boom is moved from its lowered to its elevated position, and power means included in said boom for moving said telescopic sections relative to one another, and a control means responsive to the raising and lowering movement of the forward end of said boom for operating said power means to move said telescopic sections relative to one another to cause said forward end to follow a substantially vertical path as it is raised and lowered.

6. A system as defined in calim 5 in which a power means raises and lowers the forward end of said boom and means is provided for simultaneously operating said telescopic sections and the power means as the boom is raised and lowered.

\* \* \* \* \*